(12) United States Patent
Stevenson et al.

(10) Patent No.: US 9,538,700 B2
(45) Date of Patent: *Jan. 10, 2017

(54) MATERIALS SPREADER

(75) Inventors: Donald Stevenson, Raymore (CA); Miles Evans, Regina (CA); Scott R. Degelman, Regina (CA); Trent Benko, Regina (CA)

(73) Assignee: Degelman Industries Ltd., Regina (CA)

( * ) Notice: Subject to any disclaimer, the term of this patent is extended or adjusted under 35 U.S.C. 154(b) by 395 days.

This patent is subject to a terminal disclaimer.

(21) Appl. No.: 12/947,529

(22) Filed: Nov. 16, 2010

(65) Prior Publication Data

US 2012/0048958 A1    Mar. 1, 2012

Related U.S. Application Data

(63) Continuation-in-part of application No. 12/862,394, filed on Aug. 24, 2010.

(51) Int. Cl.
*A01C 3/00* (2006.01)
*A01C 3/06* (2006.01)

(52) U.S. Cl.
CPC ..................... *A01C 3/066* (2013.01)

(58) Field of Classification Search
CPC .................. A01C 3/063; A01C 3/066
USPC ............. 239/650, 658, 677, 687, 669, 670, 671,239/672, 673, 667, 679, 681, 674, 664, 682
See application file for complete search history.

(56) References Cited

U.S. PATENT DOCUMENTS

| 2,660,439 | A | * | 11/1953 | Scranton | 239/651 |
| 3,025,067 | A | | 3/1962 | Raney et al. | |
| 3,236,527 | A | * | 2/1966 | Suyder | 239/656 |
| 3,268,073 | A | * | 8/1966 | Lehde et al. | 209/567 |
| 3,343,286 | A | * | 9/1967 | Ray, Jr. et al. | 37/413 |
| 3,891,192 | A | * | 6/1975 | Bontempi et al. | 366/90 |
| 3,964,714 | A | * | 6/1976 | Crawford et al. | 239/662 |
| 4,555,061 | A | * | 11/1985 | Linde | 239/675 |
| 4,732,330 | A | * | 3/1988 | Groeneveld et al. | 239/670 |
| 5,501,404 | A | * | 3/1996 | Meyer et al. | 239/676 |
| 6,478,674 | B2 | * | 11/2002 | Redekop | 460/112 |
| 7,172,137 | B2 | * | 2/2007 | Neier et al. | 239/1 |
| 7,871,024 | B2 | | 1/2011 | Peeters et al. | |

FOREIGN PATENT DOCUMENTS

| CA | 917695 X | 12/1972 |
| GB | 882900 Y | 11/1961 |
| JP | 5030806 | 2/1993 |
| KR | 101011674 Y | 1/2011 |

* cited by examiner

*Primary Examiner* — Arthur O Hall
*Assistant Examiner* — Viet Le
(74) *Attorney, Agent, or Firm* — Craig J. Lervick; Larkin Hoffman Daly & Lindgren, Ltd.

(57) ABSTRACT

A material spreader attached to and towed by an agricultural vehicle for spreading material such as organic material and fertilizers over a ground surface. The material spreader having a containment box and a material expeller, the expeller having rotating flails positioned along a substantially vertical axis with one or more sets of paddles swingably connected to the flails and the paddles are axially spaced apart along the flail above and below the material spreader floor a desired distance to enhance flow-through of rocks, manure and other organic material and fertilizers.

33 Claims, 14 Drawing Sheets

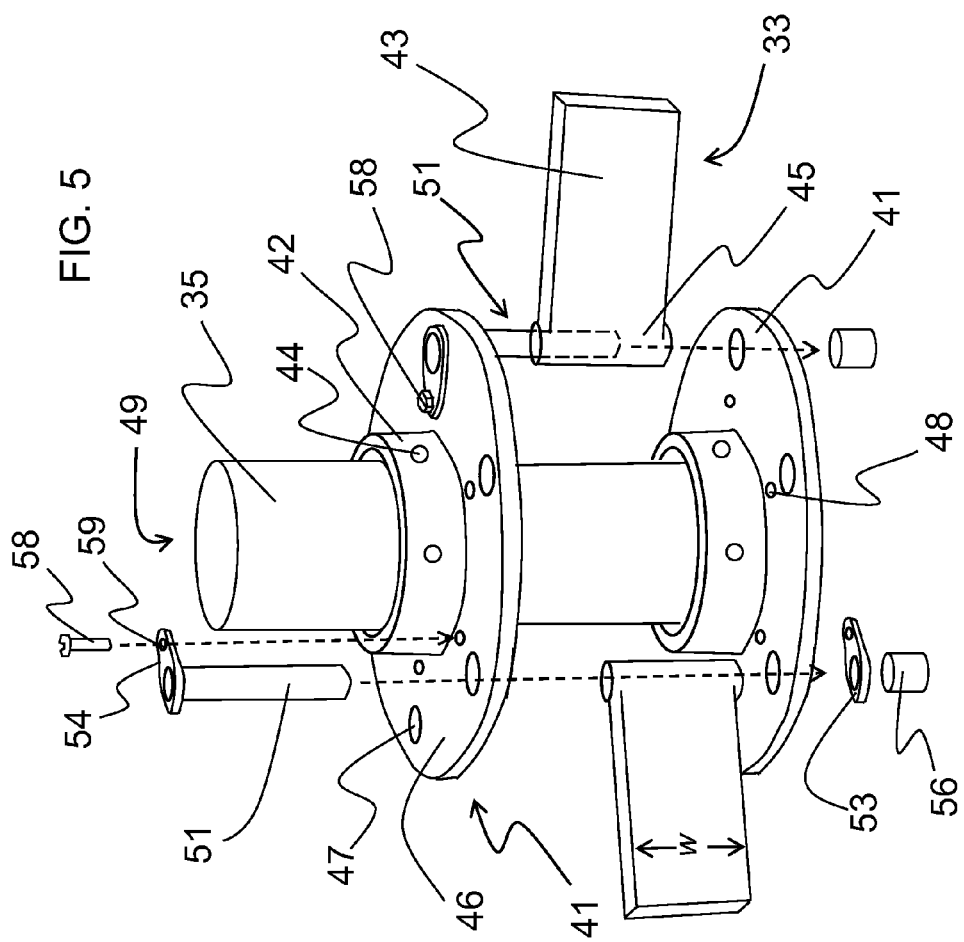

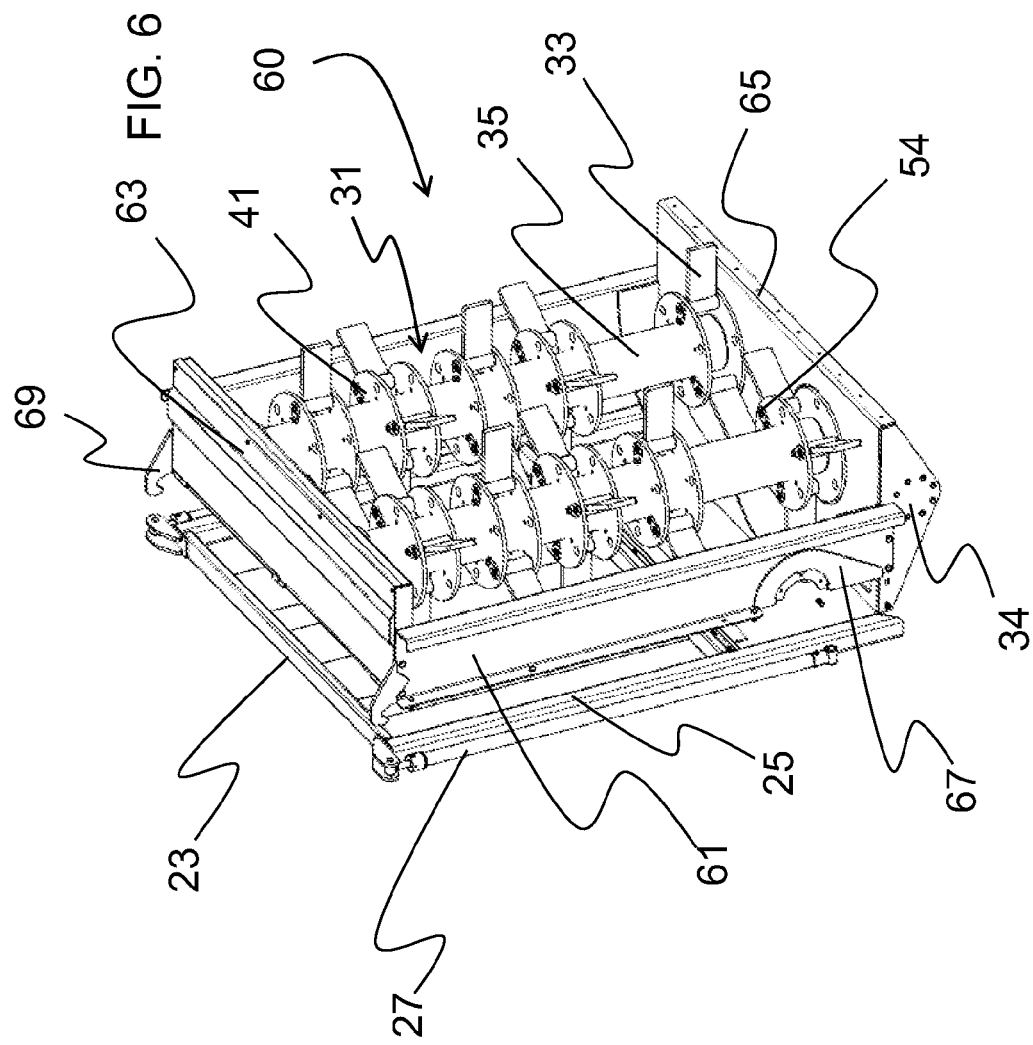

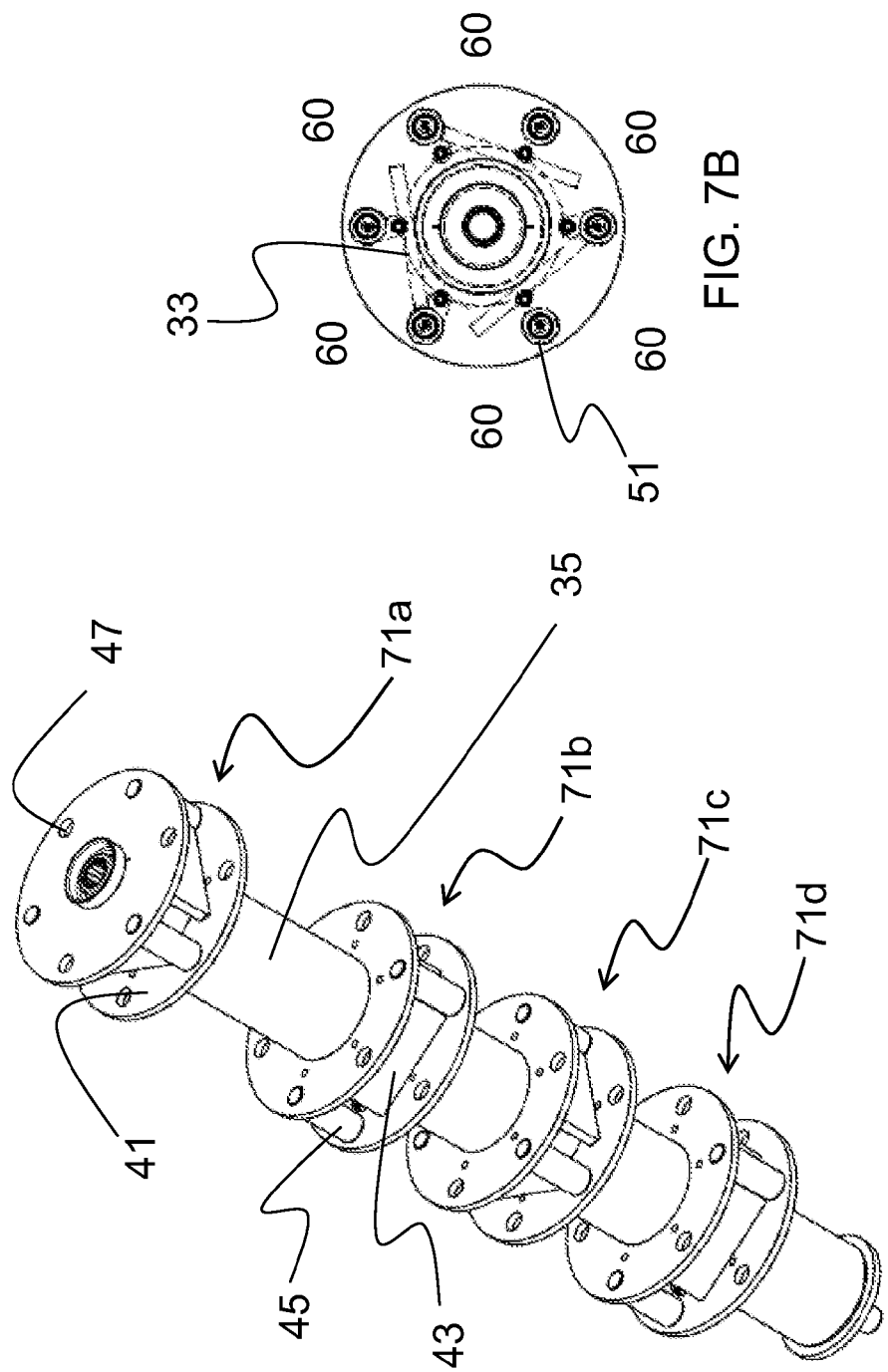

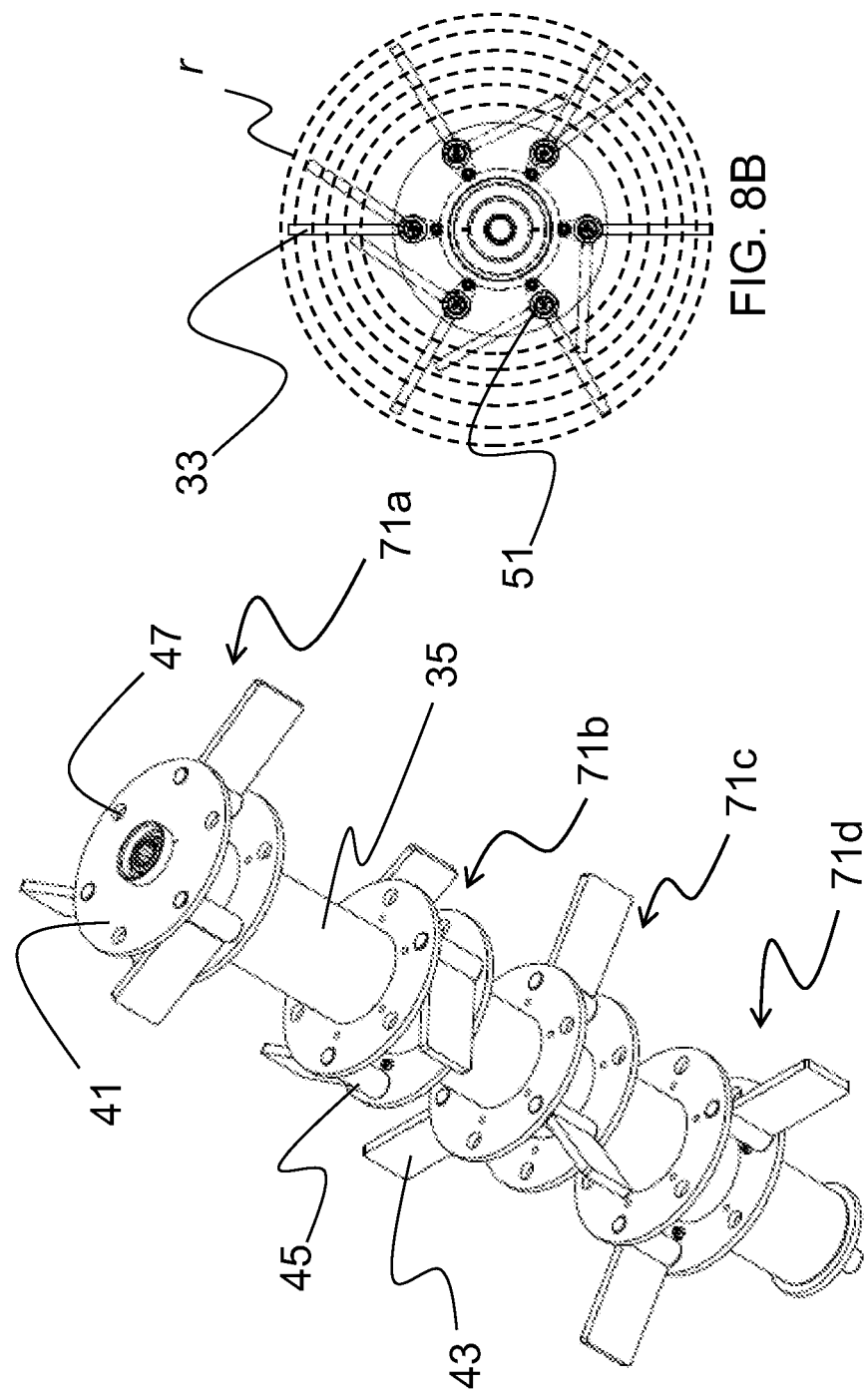

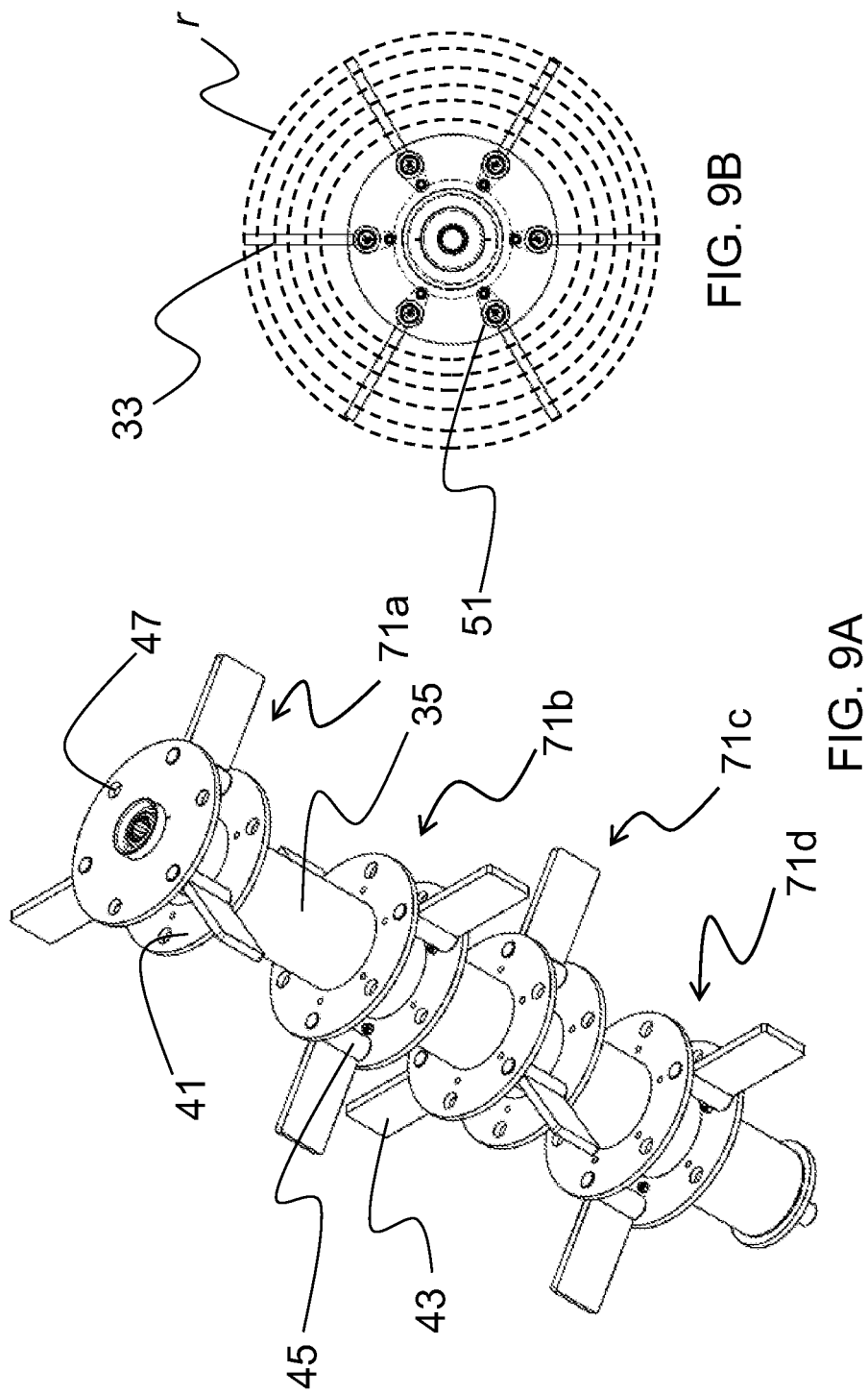

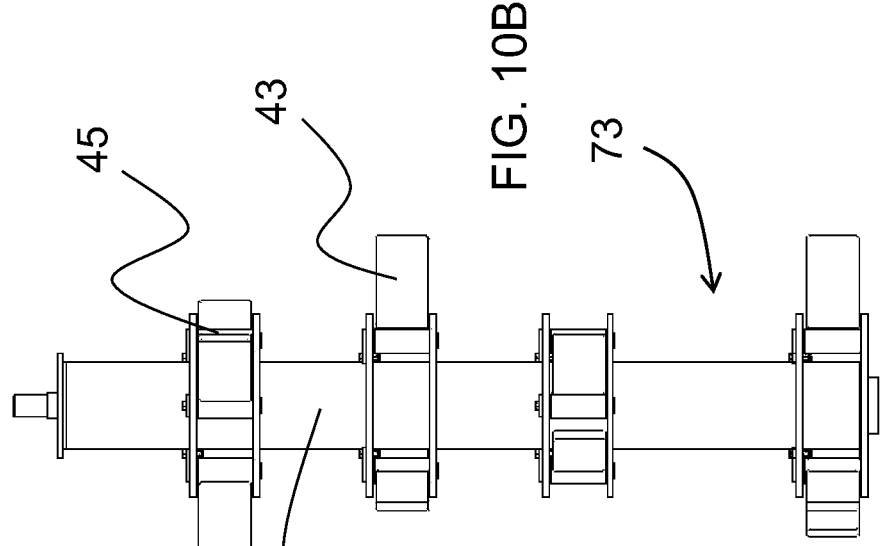
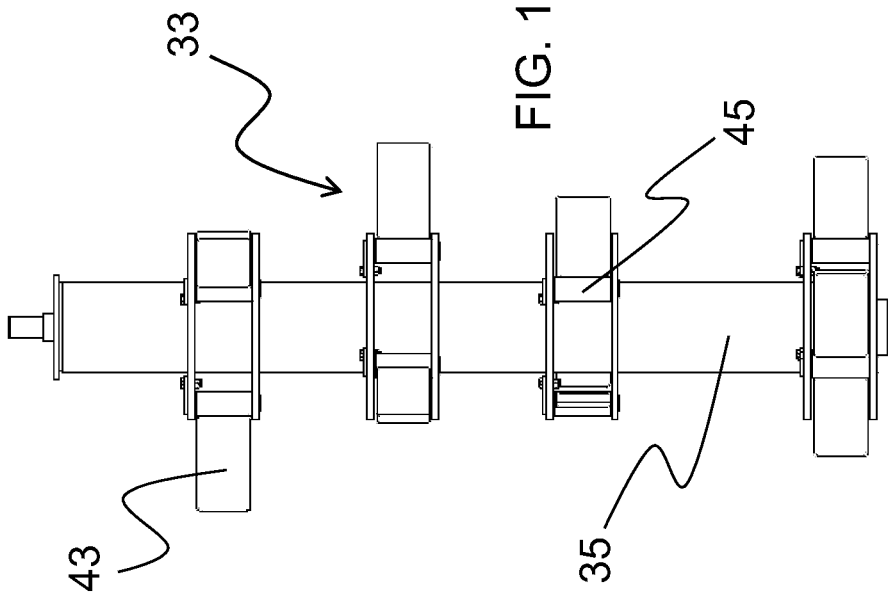

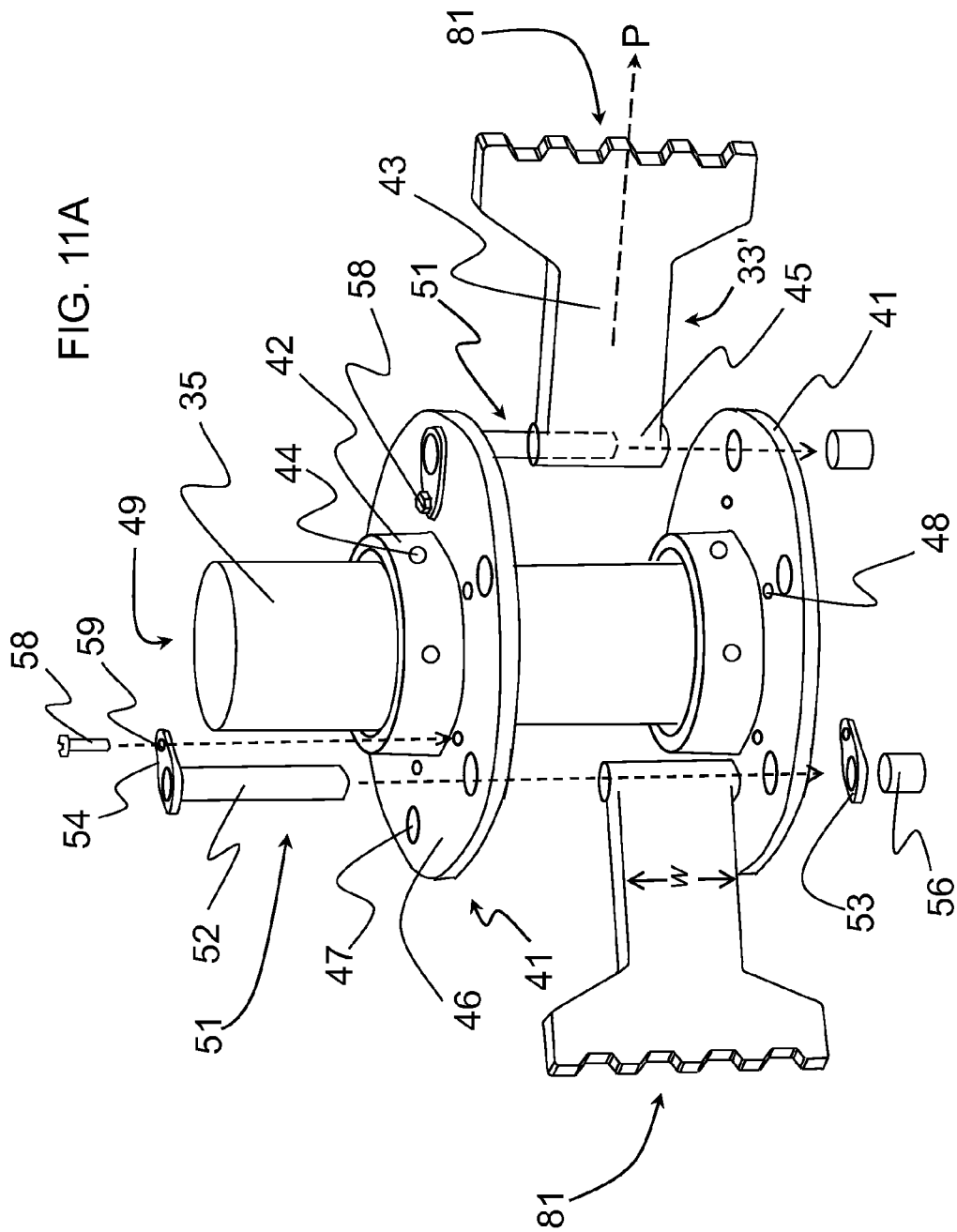

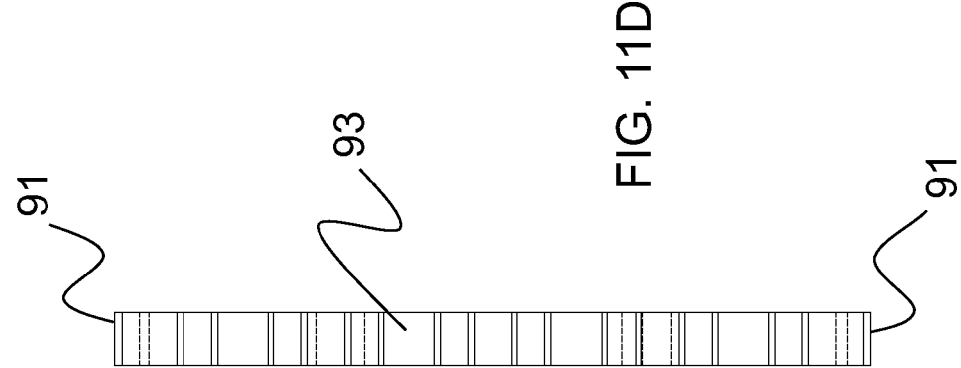
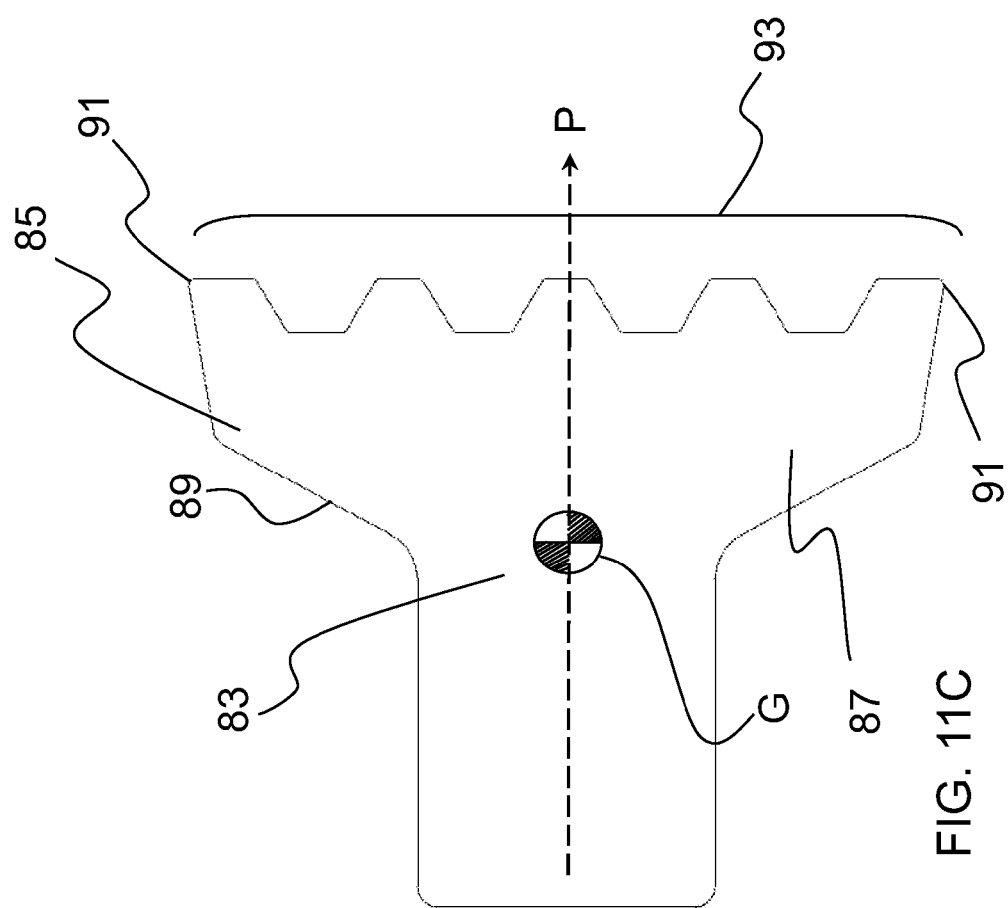

MATERIALS SPREADER

This application is a Continuation-In-Part Application of prior U.S. patent application Ser. No. 12/862,394 filed, Aug. 24, 2010 and entitled Materials Spreader.

FIELD OF THE INVENTION

The present invention relates to a materials spreader agricultural implement for receiving, containing, expelling and spreading material over a ground surface. In particular, the present invention relates to a material spreader of the type generally towed by a farm tractor or the like and having flails mounted above and below the material spreader floor. This arrangement of substantially vertically aligned flails which are free swinging facilitates an increased throw distance and consistent layering of the material being spread.

BACKGROUND OF THE INVENTION

Various machinery exists for dispensing and spreading bulk fertilizer material, generally organic fertilizers such as manure, over an agricultural field. In many commercial farming operations, organic material, including fertilizers such as animal manure, are stored in a holding area. The manure is at some point taken up and placed in a spreader of some sort and dispensed onto fields when desired. As a result of the great variety of materials used in agriculture and the differences in terrain, climate and culture, a variety of material spreaders have been developed over the years.

Box spreaders, as the name implies, include a wheeled box-like container having one or more generally horizontal screws aligned parallel with the direction of travel of the box spreader and running along the length of the bottom of the box spreader from front to back. As the screws turn the helical threads move the material towards a rear opening in the box spreader and out through the opening where the material is generally broken up and spread outwardly by rotating beaters, often referred to as expellers. Due to the discharge openings being located generally along a bottom rear portion of the box spreader, such spreaders are best employed with relatively dry materials, as any liquids would tend to leak out through the openings.

In order to accommodate materials having a higher liquid content, including slurries, sealed containers have been developed for preventing unwanted discharge of the material. Typical of these are tank spreaders including one or more generally horizontal augers for moving the material through the tank.

The present invention relates more particularly to material spreaders for drier materials, such as cattle manure. In addition to the augers which move the material through the spreader to a discharge opening in one end, these spreaders include a material expeller which disperses the material outwardly over the ground passing beneath the spreader. These material spreaders are generally some variation of either a rotating screw or a number of paddles affixed to an axle, with the screws and axles conventionally being mounted horizontally and being positioned below the floor line of the container. The paddles are rigidly secured to the screw or axle and extend out and around the axle in a helical shape. Material is drawn out of the spreader as the axle spins with the rigid paddles being highly susceptible to rock damage resulting in poorer distribution of material and higher costs for repair and replacement of paddles along the axle.

In addition to distributing the material over the ground surface, it is advantageous for the material spreader to break up the larger clumps of material. The more effectively the material is broken up and thrown to a distance away from the material spreader, the more uniform the coverage of the ground surface. Most known rotating systems of paddles or screws do not always provide an optimal level of material consistency and uniformity of dispersal where the throw acceleration is limited to the torsional speed of rotation of the screw or axel. Conventional spreaders also commonly use a hydraulic push assembly to force material into the screw expeller resulting in compression of the material and inconsistent field distribution patterns. Accordingly, there is a need for a material expeller for a material spreader resulting in improved material consistency and uniformity of dispersal.

OBJECT AND SUMMARY OF THE INVENTION

The present invention relates to an agricultural material spreader having a wheeled material container and a flailed material expeller. More particularly, the present invention relates to a material expeller having one or more flails affixed to a generally vertical axle.

One object of the present invention relates to a manure spreader having a container with a flailed material expeller at one end for breaking up and dispersing the material through an open rear end of the container and onto the ground surface as the container is towed.

Another object of the invention relates to a material spreader wherein discharge of the material through an open rear end of a container can be controlled by a rear wall which can be raised to open the rear end of the container or lowered to close the container.

A further object of the present invention provides for a material expeller having a plurality of generally vertical axles having flails attached.

Another object of the present invention is to provide a strategically located gap between a first and second set of flails to enhance flow through of rocks and manure.

A still further object of the invention relates to a material expeller having a plurality of flails affixed to an axle above and below the floor of the container.

Another object of the present invention relates to a material expeller having a plurality of flail attachments to which differently sized and shaped flails can be pivotally attached.

Another object of the invention relates to a method for controlling the homogenation of the material by affixing differently sized and/or shaped flails to the axle.

The present invention is directed to a material expeller for spreading bulk material from a containment vehicle comprising at least one rotatable drum revolvable about a first axis; a plurality of paddles pivotably affixed to the rotatable drum; and wherein each of the plurality of paddles pivots at a first end about a second axis parallel with and radially spaced from the first axis of the rotatable drum.

The present invention is also directed to a material expeller for spreading bulk material from a containment vehicle comprising a floor in the containment vehicle which supports the bulk material and an opening in the containment vehicle through which the bulk material is ejected from the vehicle; at least one rotatable drum positioned adjacent the opening and revolvable about a first axis aligned substantially vertically with respect to a ground surface supporting the vehicle to facilitate ejection of the bulk material; a plurality of separate paddles independently affixed to the rotatable drum; and wherein each of the plurality of paddles pivots about a second axis radially spaced from a surface of the rotatable drum and at least a first of the plurality of separate paddles is arranged below a plane defined by the floor and a second paddle is arranged above the plane defined by the floor.

The present invention is further directed to a method of expelling bulk material from a containment vehicle comprising the steps of defining an opening in the containment vehicle through which the bulk material is ejected from the vehicle; positioning at least one rotatable drum adjacent the opening and revolvable about a first axis aligned substantially vertically with respect to a ground surface supporting the vehicle to facilitate ejection of the bulk material; independently affixing a plurality of separate paddles to the rotatable drum; pivoting each of the plurality of paddles about a second axis radially spaced from a surface of the rotatable drum; and providing the containment vehicle with a floor supporting bulk material and directing the bulk material towards the opening in the containment vehicle and at least a first of the plurality of separate paddles is arranged below a plane defined by the moving floor and a second plurality of separate paddles is arranged above the plane defined by the active floor.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which:

FIG. 5 is an embodiment of a paddle attachment of the flail expeller assembly of a first embodiment the present invention;

FIG. 6 is an embodiment of a flail expeller assembly of a first embodiment of the present invention;

FIGS. 7A and 7B is an embodiment of a core drum assembly with paddles in a closed position of a first embodiment of the present invention;

FIGS. 8A and 8B is an embodiment of a core drum assembly with paddles in an intermediate position of a first embodiment of the present invention;

FIGS. 9A and 9B is an embodiment of a core drum assembly with paddles in an extended position of a first embodiment of the present invention;

FIGS. 10A and 10B is an embodiment of a core drum assembly of a first embodiment of the present invention.

FIG. 11A-FIG. 11E is an embodiment of a core drum assembly with paddles of a fluked shape in a further embodiment of the present invention.

DETAILED DESCRIPTION OF THE INVENTION

Figure 1:
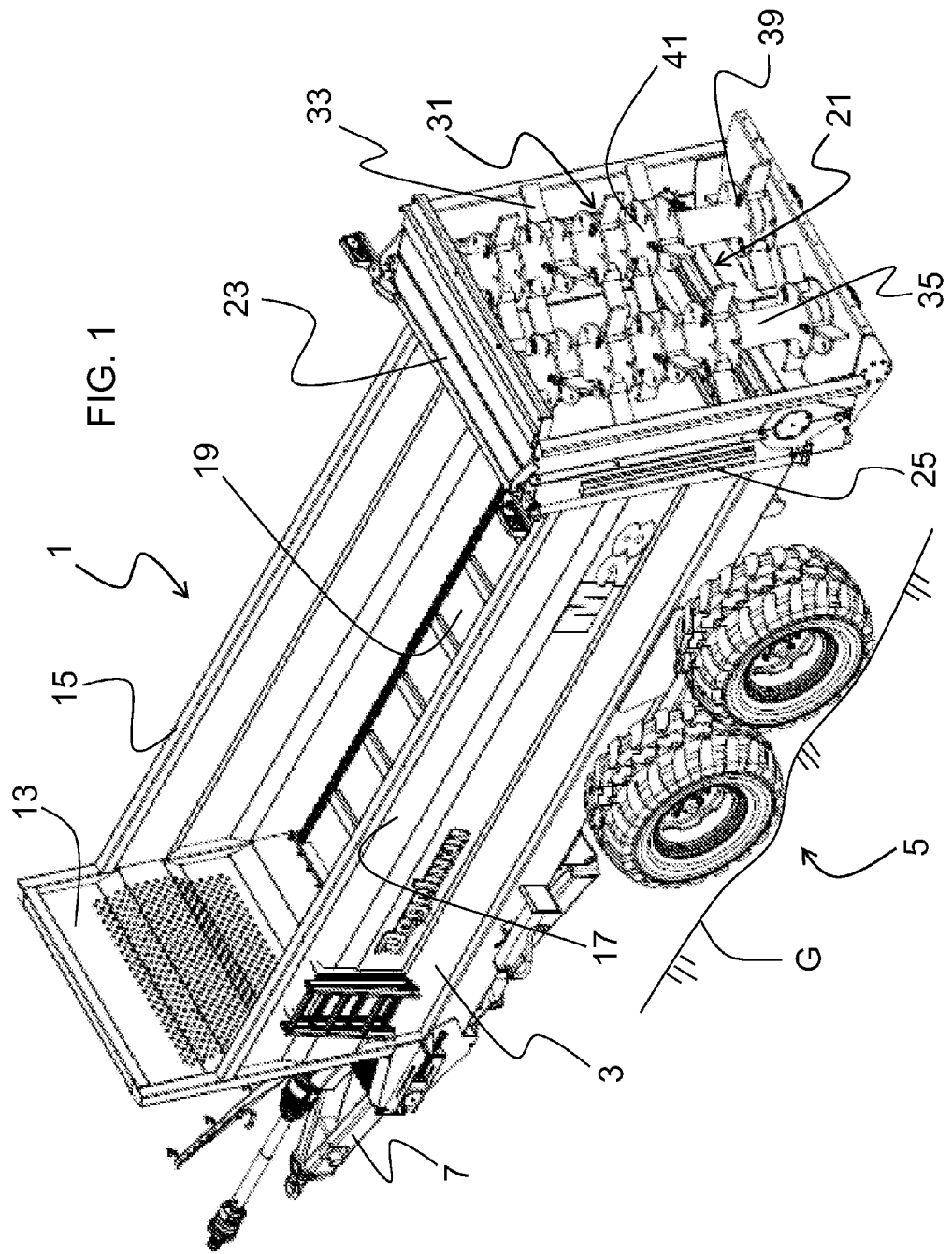
FIG. 1 is a perspective view of a first embodiment of the material spreader of the present invention.

Referring initially to FIG. 1 a new and improved manure spreader 1 is discussed in general and as it relates to the present invention. The manure spreader 1 is designed for spreading compacted and solid manure onto agricultural fields, but it is to be appreciated that the present embodiment is not limited to manure, or any particular fertilizer or material, but may be used for spreading other agricultural/commercial products and applications as well.

The improved manure spreader 1 comprises a sturdy containment box 3 supported on the ground G by a set of wheels and axles 5. The spreader 1 is generally pulled over the fields upon which the agricultural product is to be spread by a farm implement, such as a tractor, (not shown) which pulls the spreader 1 by a hitch 7 connected to the front-end of the containment box 3. The containment box 3 includes a front wall 13, sidewalls 15 and 17, and a floor 19. In the present embodiment, the floor 19 is formed with a moveable conveyor system to facilitate the movement of the agricultural product toward a discharge opening 21 in the containment box 3.

Figure 2:
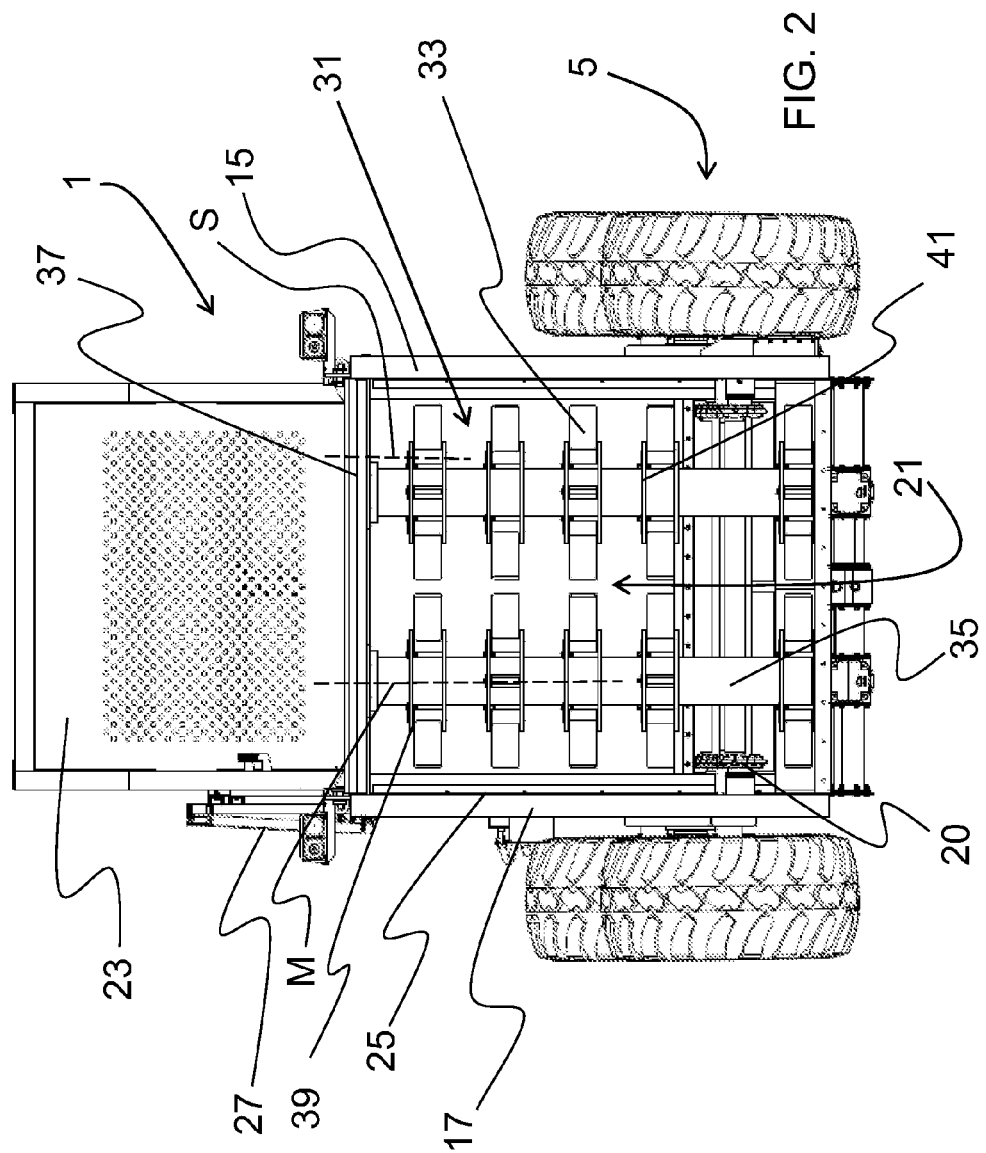
FIG. 2 is a rear view of the first embodiment of the material spreader of the present invention showing the flail expeller assembly.

The discharge end of the spreader 1 includes a moveable gate 23 slidably received in the containment box 3 and the gate 23 is sized and arranged to substantially close and/or cover the discharge opening 21 in the containment box 3. Essentially the gate 23 controls and defines the size of the discharge opening 21. When the gate 23 is raised entirely up, as in FIG. 2, the discharge opening 21 is essentially entirely open into the containment box 3. An operator's control of the gate 23, by raising and lowering it, permits the operator to vary the amount of manure or other agricultural product presented to the flails 31 for discharge at any given time.

To selectively open and close the discharge opening 21 of the spreader 1, the operator need merely toggle suitable controls (not shown) in the tractor connected to a hydraulic system on the spreader 1 operating the gate 23. In a preferred embodiment the gate 23 is situated along a pair of rails 25 on the sidewalls 15 and 17 of the containment box 3. The gate 23 is mounted for vertical reciprocation in the rails 25 on the inside surfaces of the sidewalls 15 and 17. Reciprocation of the gate 23 is achieved by a hydraulic cylinder 27 between the gate and the sidewalls 15, 17 of the containment box 3. Hydraulic lines (not shown) from the tractor supply hydraulic fluid to the cylinders 27. By actuating suitable controls in the tractor, the cylinders 27 can be made to raise and lower the gate. When the gate is in its fully raised position as in FIG. 2, the discharge opening 21 is entirely open, and when the gate 23 is in a closed position the gate 23 slides completely down the rails 25 into the containment box 19 and can cover the entire discharge opening 21 to stop the discharge of product.

The flails 31 include a plurality of paddles 33 mounted on a core drum 35 which rotates about substantially vertical main axes M in the discharge opening of the containment box 3. The main axes M are axially spaced apart so that preferably the flails 31 do not interfere with one another during rotation. In other words, the flails are maintained at a sufficient distance so that the free ends of the paddles 33 cannot interfere or hit one another. Each paddle 33 is rotatably supported by the core drum 35 about a secondary axis S which is generally parallel with the main axis M, but axially spaced therefrom about the main axis M. The secondary axis may be structurally defined as a pin or other rotatable connection which permits the free rotation of the paddle 33 about the secondary axis S relative to the main axis M. Whatever the structure making up the secondary axis S, the secondary axis S extends between a pair of flanges or connecting rings 41 that are mounted along the core drum 35 and observing the substantially vertical alignment of the main axis M for example in FIG. 2, the paddles 33 extend at a substantially perpendicular angle relative to the main axis M and core drum 35.

Each paddle 33 is permitted to rotate about the secondary axis S so the radial alignment of each paddle may vary relative to the cross-section of the core drum 35. Keeping in mind circle-line geometry, because of the relative rotation occurring about the secondary axis S, a paddle can rotationally extend relative to the cross-section of the core drum 35 so as to define the radial paddle axis as either a tangent line, a secant line even a non intersecting line with the core drum 35. In other words, the paddle can extend so as to define the radial paddle axis intersecting the core drum cross-section at one point, a tangent, or at two points, known as a secant, or because of the arrangement of the secondary axis S spaced from the outer surface of the drum 35, not at all, i.e. a non-intersecting line. This flexible arrangement provides an angular range of motion of the paddle 33 relative to the core drum 35 of in some cases over 180 degrees.

Figure 4:
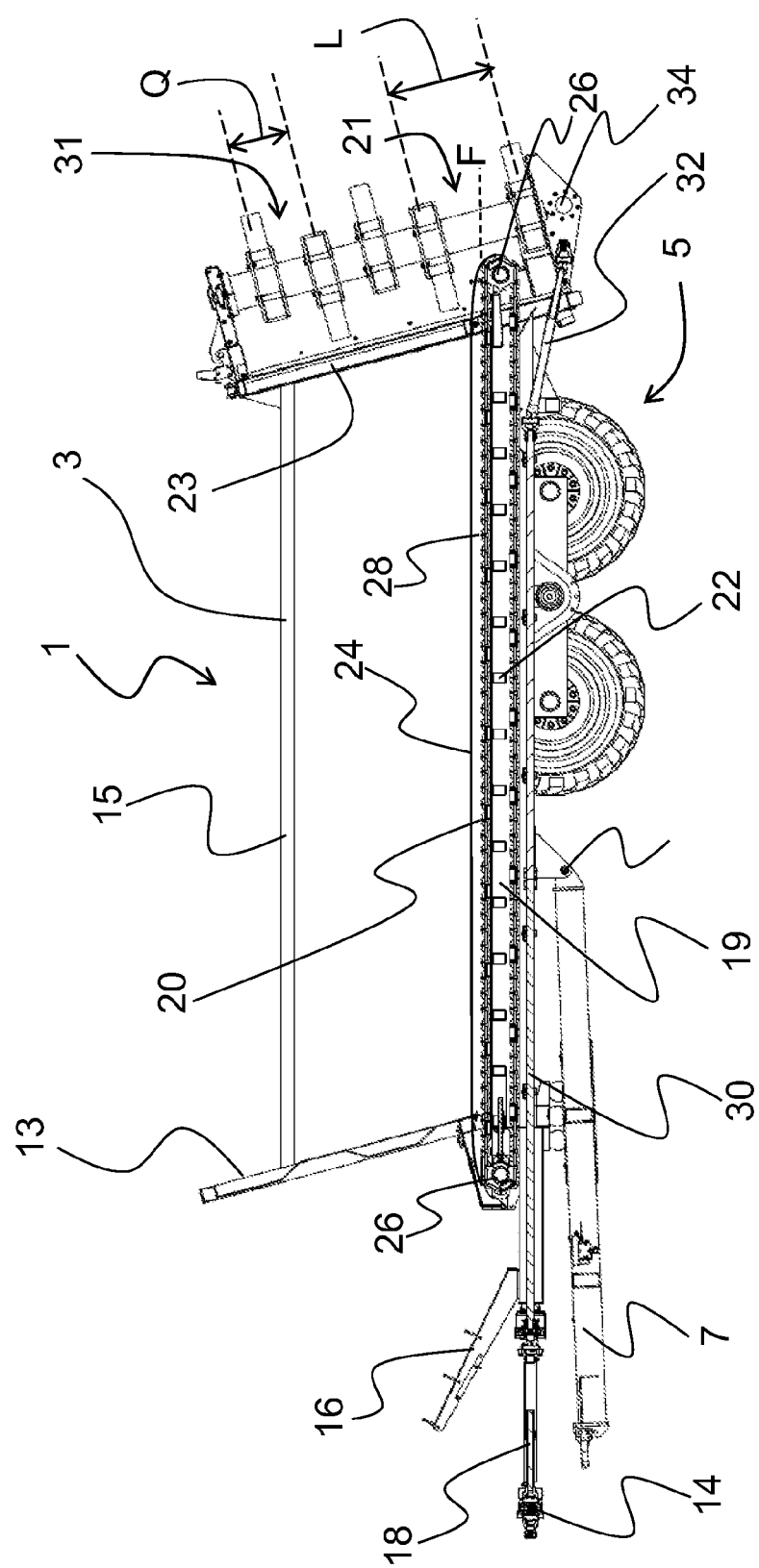
FIG. 4 is an internal view of a first embodiment of the material spreader of the present invention showing the conveyor system.

The core drum 35 is journaled at one end below the floor line F of the containment box 3 and the other end of the core drum 35 is journaled to a horizontal support 37 spanning the discharge opening 21 between the sidewalls of the containment box 3 as shown in FIG. 4. Each set of connecting rings 41 and paddles 33 are positioned axially along the core drum 35 and relatively evenly axially spaced apart, with the exception of a first and second set of connecting rings 41 and paddles 33 that are positioned with increased axial space L that is larger than the space Q between each of the remaining connecting rings 41 and paddle 33 sets. This arrangement aligns a first set of rings and paddles below the floor line F and a second set above the floor line F of the containment box 3. This increased spacing between the flail sets enhances flow through of rocks and manure through the discharge opening 21. This larger axial space L also presents any physical contact of the flail paddles 33 with the chains, slats and/or chain drive of the conveyor system 20.

Each flail 31 includes a plurality of individual paddles 33 which are rotatably affixed to the core drum 35. Each paddle 33 is independently rotatable about the secondary axis S which is radially spaced from the core drum 35 of the flail 31. Each paddle 33 includes a first end rotatably connected to and rotating about the secondary axis S in a substantially vertical plane and the free end which extends outwards from and is spaced from the first end. In other words, keeping in mind that the core drum 35 is disposed on a substantially vertical axes in the discharge opening 21 of the containment box 21, the paddles 33 extend radially outward, substantially horizontally, from the core drum 35 and the paddles 33 are all allowed to rotate freely relative to the core drum 35 about the secondary axis S. The secondary axes 39 are supported between the pair of connecting rings 41 surrounding the core drum 35, the connecting rings 41 aiding in ensuring that the paddles 33 of the flail 31 are maintained in a substantially vertically planar position extending perpendicularly from the main core 35 despite the freedom of the paddles 33 to rotate about the secondary axis S.

Figure 3:
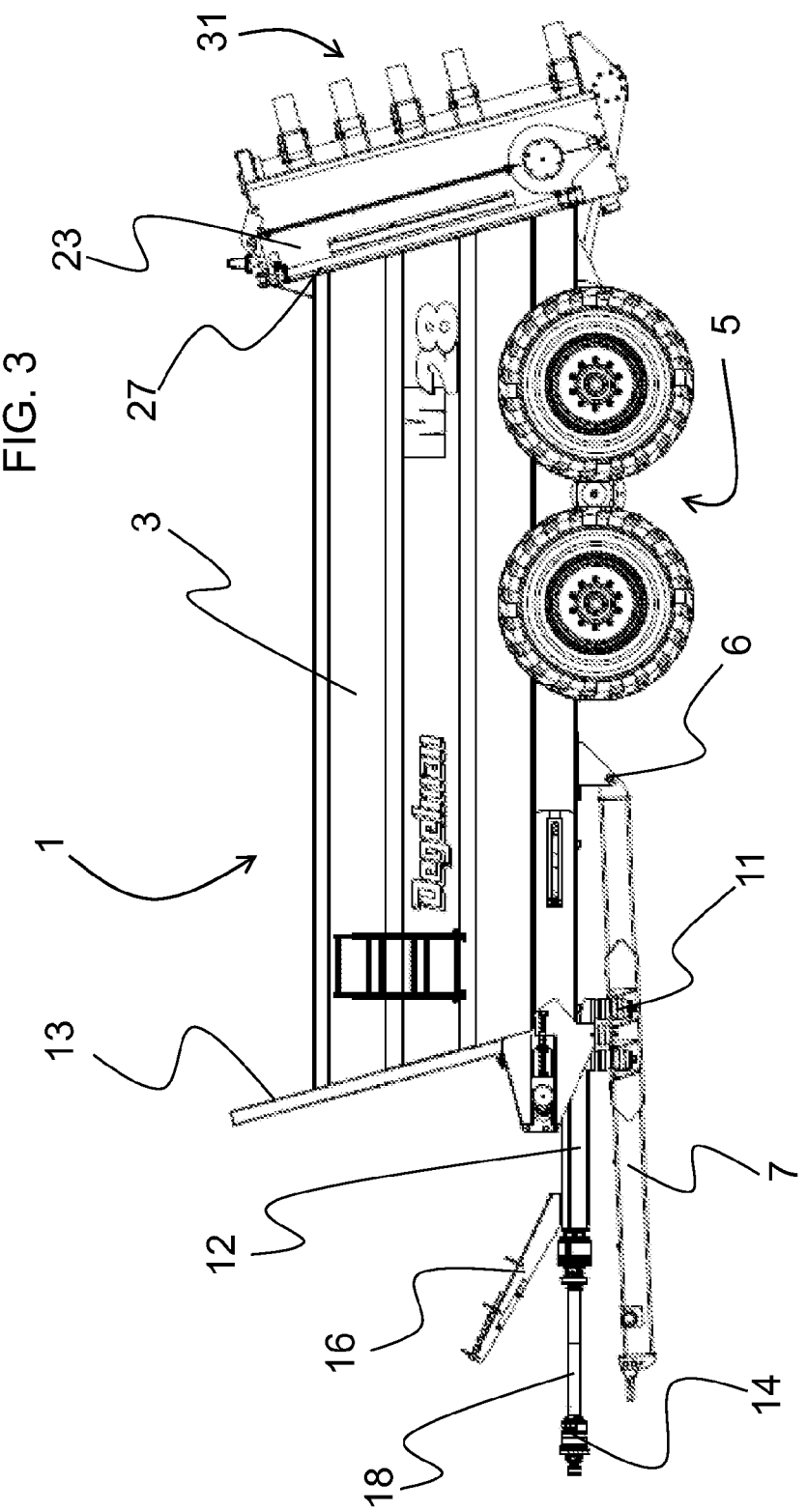
FIG. 3 is a side view of a first embodiment of the material spreader of the present invention.

The containment box 3 of the materials spreader as shown in FIG. 3 is supported on a frame 12 that extends from an extension hitch 14, beneath the containment box 3 to the discharge opening 21. The tractor hitch 7 is connected to a midpoint along the frame using a hitch pivot connector 6. The frame 12 is supported on the tractor hitch 7 using suspension struts 11 to allow for steady load and weight distribution of the materials spreader 1 in pulling the spreader along uneven terrain. The spreader 1 may have a hydraulic dumping controller 16 that moves the extension hitch 14 along the length of the frame 12 and using the pivot connector 6 of the tractor hitch 7 forces the containment box 3 to tip upwards and dump the load of the materials spreader 1 towards the discharge opening 21. By tilting the containment box 3 to move material towards the flails 31, the material within the spreader 1 is not compressed creating clumping and uneven discharge of the material to the ground surface.

In a preferred embodiment, as shown in FIG. 4, and to further aid in discharging the load from the containment box 3, the floor 19 is adapted to be a movable, and generally horizontally aligned conveyor system 20. The conveyor system 20 is constructed which in one embodiment uses strut supports 22 supporting a moveable floor 24 propelled by a drive system 26 including a motor and chain 28. The strut supports 22 are a supporting frame permitting the moveable floor 24 to slide across the strut supports 22 with a large load of fertilizer supported on the moveable floor. The moveable floor 24 may have floor joists (not shown) fixed to the outer surface of the moveable floor 24 which travel with the floor 24 drawn by the chains 28 on either side of the container. The floor 24 and joists are pulled by the chains 28 and the drive system 26 to draw material within the containment box 3 towards the discharge opening 21.

For very large loads the tractor provides controls for an elevator to raise one end of the containment box 3 so as to use gravity to also direct material to opening 21 and the flails 31 in addition to the conveyor system. In either event use of a conveyor or elevator, the floor of the containment box 3 is defined to be active to ensure that as the load is reduced or terrain is more aggressive the material to be spread is more easily provided to the discharge opening 21 and the flails 31. Speed adjustments of the conveyor system 20 and controls may be integrated with the speedometer and controls of the tractor adjusting the speed of the conveyor system 20 to a slower speed as the tractor slows down or faster speed on acceleration of the tractor. In this way the material is fed to the flails 31 at speeds that match the tractor speed reducing clumping of material or a complete discharge of material in a single spot as the tractor comes to a stop.

A power train 18 extends from a power take off (not shown) of the tractor or towing implement and connects via connecting rod 32 to a gearbox 34 supporting and driving the flails 31. The gearbox 34 may use spline gears (not shown) to facilitate a rugged connection and drive of the flails 31. The control and speed of the rotation of the flails 31 via the power train may also be integrated to correspond to the tractor engine speed providing for the core drum 35 to rotate at a desired speed relative to the RPM of the engine.

In a preferred embodiment as shown in FIG. 5, each paddle 33 and connecting ring 41 are interchangeable and reversible and are replaceable without welding or cutting of a metal assembly. Each paddle 33 has a blade 43 and tubular mounting attachment 45 although other types of attachments of the paddle 33 to the drum are contemplated. Each connecting ring 41 has a mounting bracket 42 that has series of bolt openings 44 to connect the ring 41 to the core drum 35. The connecting ring 41 also has a flange 46 that circumscribes the core drum aperture 49 and extends essentially perpendicularly from the mounting bracket 42, the mounting bracket. The disc 46 creates a horizontal surface which includes a set of larger openings 47 and smaller openings 48 evenly spaced around the core drum aperture 49 for facilitating the connection of the paddles 33 as described below.

By way of explanation, a plurality of connecting rings 41 are slid onto the core drum 35 and fastened thereto at desired intervals along the drum by bolts through the bolt openings 44. A paddle 33 is then attached at each of the desired or respective fastening point between two adjacent connecting rings 41. Any number of fastening methods and structures may be used but in the embodiment of FIG. 5 a paddle 33 is attached to the connecting ring 41 by inserting a pivot pin 51 through an opening 47 in the flange 46 of one of an upper connecting ring 41 and correspondingly inserting the pivot pin 51 through the paddle tubular mount attachment 45. The inner diameter of the tubular mount attachment 45 is sized slightly larger than the outer surface of the pivot pin 51 to allow the paddle 33 to pivot about the pivot pin 51. The pivot pin 51 may be formed from different materials including rigid composite plastic or more practicably steel and has a flange projection 54 including a securing bolt hole 59. The pivot pin 51 extends a length to span the distance between the adjacent connecting rings and also enter into an axially aligned opening 47 of a lower adjacent connecting ring 41. A bolt 58 is inserted through the securing bolt hole 59 offset from an axis of the pivot pin 51 and through the mounting hole 48 similarly offset from the opening 47 in the flange 46 of the connecting ring 41 to rotatably secure the pivot pin 51 between adjacent connecting rings 41. A shim or bearing sleeve 56 may also be provided in the opening 47 to facilitate the rotation and bearing of the pin 51 in the connecting rings 41.

The paddle 33 is thus supported by the pivot pin 51 between the connecting rings 41. By applying the pivot pin 51 as the connector for the paddle 33, the paddle 33 is free to swing in a rotation about the pivot pin 51 over at least 180 degrees until it is stopped by abutting adjacent paddles 33. In another embodiment, the paddle length is shorter than the distance to the adjacent pivot pin 51 allowing the paddle 33 to swing all the way from contact with the core drum 35 on one side, to contact with the core drum on the other side. This free swinging motion of the paddle 33 unlike a known fixed blade of the prior art on a screw or auger allows for increased momentum and rotational acceleration of the paddle 33 about the pivot pin 51 to enhance the rotational forces generated by the core drum 35. In other words, the paddles are subject to two separate rotational accelerations, the first around the core drum axis M and the second around the pivot pin 51 axis S. The additional rotational forces acting on the paddle 33 around the pivot pin 51 result in a composite force generated through the swinging paddle 33 which freely carries and propels manure or other fertilizer material from the spreader a greater distance than the known spreaders and expellers. In other embodiments, the pivot pins 51 may be secured in another manner between the connecting rings to facilitate the rotation and swinging of the paddles 33. Also, other structures and attachment mechanisms may be used to affix the paddle 33 to the connecting ring 41 and even other structures besides connecting rings 41 can be used to rotatably attach the swinging paddles 33 to the core drum 35. It is important for maintenance of the machine that any attachment would provide for the paddle 33 being easily and quickly removed from the core drum 35 without welding or cutting of the paddle 33, attachment mechanism or core drum 35.

As shown in FIG. 6, the flails 31 are part of an expeller assembly 60 which is removable from the vehicle itself, and which is shown connected to the vehicle in FIGS. 1-4. A main frame 61 is provided with a top wall 63 and a bottom wall 65 to which the core drum 35 is attached and sidewalls 62 extending therebetween. The gearbox 34 and mounting support for the core drums 35 are located on or below the bottom wall 65. A reinforced notch 67 may be formed in a rear portion along the sidewalls 62 of the main frame 61 to provide sufficient space to accommodate the conveyor system 20 and permit the conveyor drive 26 to move the material within the box frame 61 as close as possible to the flails 31.

In another important aspect of the present invention, the entire expeller assembly 60 and even the power train 18 may be removed from the containment box 3 by disengaging latches 69 located on each side of the expeller assembly 60 with an appropriate rail portion 25 of the containment box 3 and disengaging the power train 18 from the gearbox 34. This permits the spreader to become a general purpose wagon with an active floor to carry other materials, silage, dirt and grain. Alternatively the expeller 31 may be hinged in a manner that does not require the entire assembly be removed from the vehicle but can tilted down and away from the containment box 3 using a hinge system attached to the frame 12. The easy removal or tilting access to the expeller assembly 31 provides for superior efficiency in removing blockages, cleaning, maintenance and repairs of the assembly 60.

The free swinging design of the paddle 33 using the pivot pin 51 or other similar mechanism for attachment allows a paddle blade 43 to be replaced without removal of the core drum 35 or the connecting ring 41 and without requiring welding or cutting of the ring or paddle elements. Tilting or removing the expeller assembly 60 from the containment box permits easy access to the bolt 58 holding the pivot pin 51 in and the pivot pin 51 may be removed. The pivot pin 51 can be readily removed from out of the paddle 33, and a broken or damaged paddle 33 removed from the expeller assembly 31 and repaired or replaced. While replacement of a paddle 33 is easy and accessible, the free swinging paddle design also reduces breakage of paddle blades 43 due to rocks mixed within the material and forced into the expeller. In encountering a rock or other solid object the paddle blades 43 are free to retract from the force of the encounter and bounce away without breaking unlike the rigid screw or auger blades of the prior art that may shatter when encountering a hard object in the spread material such as a field stone.

Sets of connecting rings 41 and paddles 33 are installed along the core drum 35 with each set positioned at various distances to optimize the amount of material that is spread and distances that the material is thrown based on the total amount of material that is in the containment box 3 and the adjusted width of the gate opening. The paddles may be of various sizes and shapes with straight, curved or rounded edges or indented to optimize distance that the material is thrown. As described above a substantial gap or space, larger than other spacing along the flail, is provided between the lowermost first and second pair of connecting rings 41 and respective paddles 33. As best seen in FIG. 4, this arrangement positions a ring and paddle set both above and below the floor line F of the containment box in axial and vertical alignment along the drum 35. Unlike the prior art that positions the flails only below the floor line F, the present invention includes a plurality of flails above the floor line F which facilitates drawing and spreading of material from different levels of the bulk of material delivered by the active floor to the flails. In other words, the use of paddles and ring sets spinning above and below the active floor of the containment box 3 as the material is fed into the expeller through the discharge opening 21 permits a larger quantity of the bulk material to be spread by the rotating flails 31. The gap between the first and second lower flail sets allows larger, heavier objects such as rocks and field stones which often shift and fall to the bottom of the material pile and the active floor of the containment box 3 to pass easily through the gap thereby reducing damage and breakage of the flail paddles 33.

As shown in FIGS. 7A-7B to 9A-9B a series of 3 paddles 33 may be arranged on a first ring set 71*a* in every other opening 47 of the ring. The next consecutive ring set 71*b* may have another series of 3 offset 60 degrees for instance from the next adjacent set of paddles and rings. Other offsets can be accomplished between axially spaced paddle and ring sets to facilitate a more efficient spreading of material along the length of the drum 35. A next ring set 71*c* may have the paddles 33 attached in alignment with 71*a* or alternatively even offset from both 71*a* and 71*b*, and the following ring set 71*d* may have paddles 33 attached in alignment with 71*b*, or again alternatively offset from any other ring and paddle set. As the core drum 35 rotates, the offset nature of the paddles 33 rotating around the core drum 35 as shown in FIG. 7B provides that a sufficient quantity of material is taken up by the flails 31 at any given point in time during the drum rotation so that the consistency of the spreading operation is improved. An extended position of the paddles 33 during rotation of the flails 31 is shown in FIG. 9B.

The alignment of the ring sets 71 in an aligned or offset position allows significant coverage of one or more paddle blades 43 to meet and direct material forced into the expeller 31, and the free swinging movement of each blade 43 around the pivot pin 51 provides for non-conformity in the position of each blade 43 as the core drum 35 rotates. This non-conforming movement allows a blade to be at any position within the axis of rotation r as shown in FIGS. 8B and 9B and increases the potential for contact of one or more blades 43 with material that has been pushed into this axis of rotation.

The ring sets 71 may as described have a gap 73 between one or more sets along the core drum 35 to accommodate different weights, volumes, shapes and sizes of material being forced into the expeller 31 as shown in FIG. 10. Also shown is the indeterminent positioning of each of the paddles 33 within each ring set 71 as the core drum 35 spins and the paddles 33 are flung from side to side around the pivot pin 51. The paddles 33 may be squared or tapered blades or may be rounded off on each edge. A square blade 43 without rounding covers the greatest surface area when fully extended to catch and draw material as it is expelled. However, various blades surfaces with curves or indentations may also be suitable for the disclosed invention.

Figure 11B:
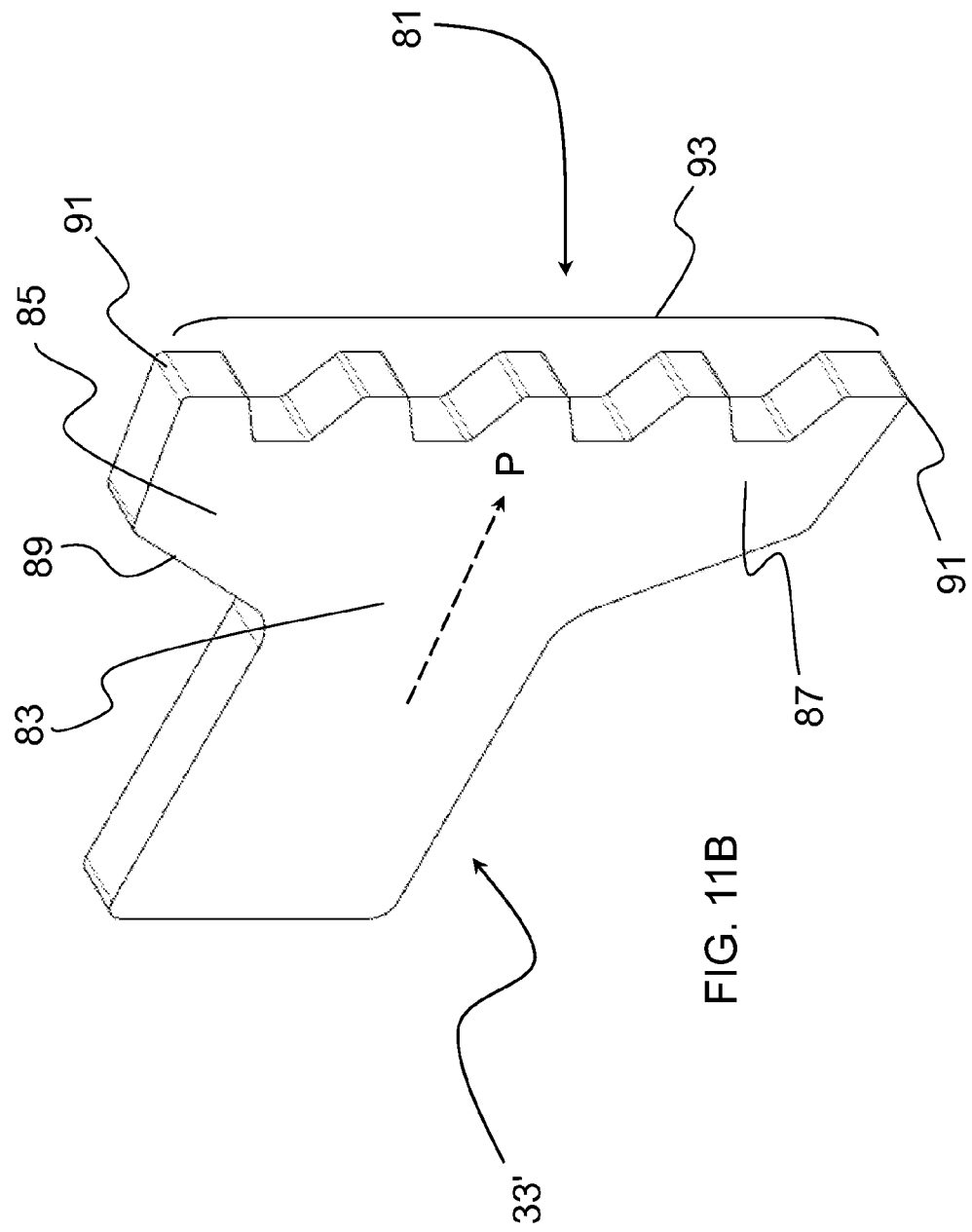

In another embodiment of the present invention as shown in FIGS. 11A-E, the paddles 33' are provided with a unique free end portion 81 which further facilitates the even expulsion and spreading of material from the containment box 3. As discussed previously, each paddle 33' has a rotatably securable paddle tubular mount attachment 45 which rotatably attaches to the core drum 35 by inserting a pivot pin 51 through an opening 47 in the flange 46 of one of an upper connecting ring 41 and correspondingly inserting the pivot pin 51 through the paddle tubular mount attachment 45 as shown in FIG. 11A. The inner diameter of the tubular mount attachment 45 is sized slightly larger than the outer surface of the pivot pin 51 to allow the paddle 33' to pivot about the pivot pin 51.

Also as discussed above, the pivot pin 51 may be formed from different materials including rigid composite plastic or more practicably steel and has a flange projection 54 including a securing bolt hole 59. The pivot pin 51 extends a length to span the distance between the adjacent connecting rings and also enter into an axially aligned opening 47 of a lower adjacent connecting ring 41. A bolt 58 is inserted through the securing bolt hole 59 offset from an axis of the pivot pin 51 and through the mounting hole 48 similarly offset from the opening 47 in the flange 46 of the connecting ring 41 to rotatably secure the pivot pin 51 between adjacent connecting rings 41. A shim or bearing sleeve 56 may also be provided in the opening 47 to facilitate the rotation and bearing of the pin 51 in the connecting rings 41. This is not the only way of attaching the paddles 33' to the apparatus, other ways of attaching the paddle 33' are also contemplated by this design. The paddle 33' can be thus supported by the pivot pin 51 between the connecting rings 41. By applying the pivot pin 51 as the connector for the paddle 33', the paddle 33' is free to swing in a rotation about the pivot pin 51 over at least 180 degrees until it is stopped by abutting adjacent paddles 33'.

As shown in FIG. 11B, the free end portion 81 of the paddle 33' is formed with a relatively larger surface area to grab more of the bulk of material being ejected from the containment box 3. This larger, "fluke" shaped surface area extends the axial effectiveness of the paddle 33' in a more vertical direction relative to the opening in the containment box 3 so that more material emanating from the box 3 is directly affected by the paddles 33'. The paddle 33' itself extends from the tubular mount attachment 45 along a longitudinal axis P, which as discussed above, remains substantially perpendicularly aligned relative to the core drum 35 even with the paddle 33' rotating relative to the core drum 35. The paddle 33' extends towards the free end portion 81 of the paddle 33' where the fluke shaped surface area is defined with laterally extending portions 85 and 87 oppositely extending from the paddle 33' in the vertical direction to extend the width of the fluke 83 relative to the longitudinal axis P of the paddle 33'.

From the longitudinal sides of the paddle 33', each side 89 of the fluke 83 depends outwardly from the axis P at a not quite 90 degree angle and then turns back again to almost parallel the axis P before ending at a termination point 91 where a crenellated edge 93 of the fluke 83 extending between the opposing termination points 91 defines the end of the paddle 33'. The fluke 83 thus not only provides greater surface area for contacting and influencing material being expelled from the containment box 3 but provides the surface area in a substantially vertical direction above and below the longitudinal axis P of the paddle 33' to ensure that material above and below the paddle is also spread in an effective manner from the containment box 3 and onto the ground. It is to be appreciated that the fluke 83 provides not only greater surface area to the end of the paddle 33', but also adds additional weight to the end of the paddle 33' which directly contacts the material to be expelled. The crenellated edge 93 provides increased edge surface area at the end of the paddle 33', (as compared to a straight edge extending between the termination points 91). The increased weight and edge surface defined by the fluke 83 facilitates greater breaking up and cutting of material which is being expelled from the containment box 3 resulting in a finer material dispersion and greater throw distance of the material by the paddles 33'.

The extending portions 85, 87 of the fluke 8 increase the relative width and weight of a portion of the paddle 33' beyond the width defined between the connecting rings 41 and thus, in a resting position when the drum 35 is not rotating, the fluke 83 may rest or abut against the outer edges of the connecting rings. This larger surface area arrangement at the free end of the paddle 33' provides coverage of the vertical areas between adjacent sets of connecting rings 41 where the straight sides of the initially described paddles 33' do not reach. With the opposing sides of the fluke 83 extending beyond the width of the connecting rings 41 which support the paddles, any material expelled from the containment box 3 in between the connecting ring sets 41 will now also be directly contacted by the fluke 83 of the paddle and aggressively expelled into a broad dispersion pattern on the ground. It is to be appreciated that the surface area of the free end of the paddle 33' could be increased in other shapes besides extending the sides of the paddle 33' as a fluke as described above. Other forms for increasing the surface area could include altering the planar surface of the front and back surfaces of the paddle 33' to be non-planar. For example, the front surface of the paddle 33' which contacts the material directly could have an undulating topographical form or another three dimensional surface configuration which also increases the surface area of the free end of the paddle 33'.

Figure 11E:
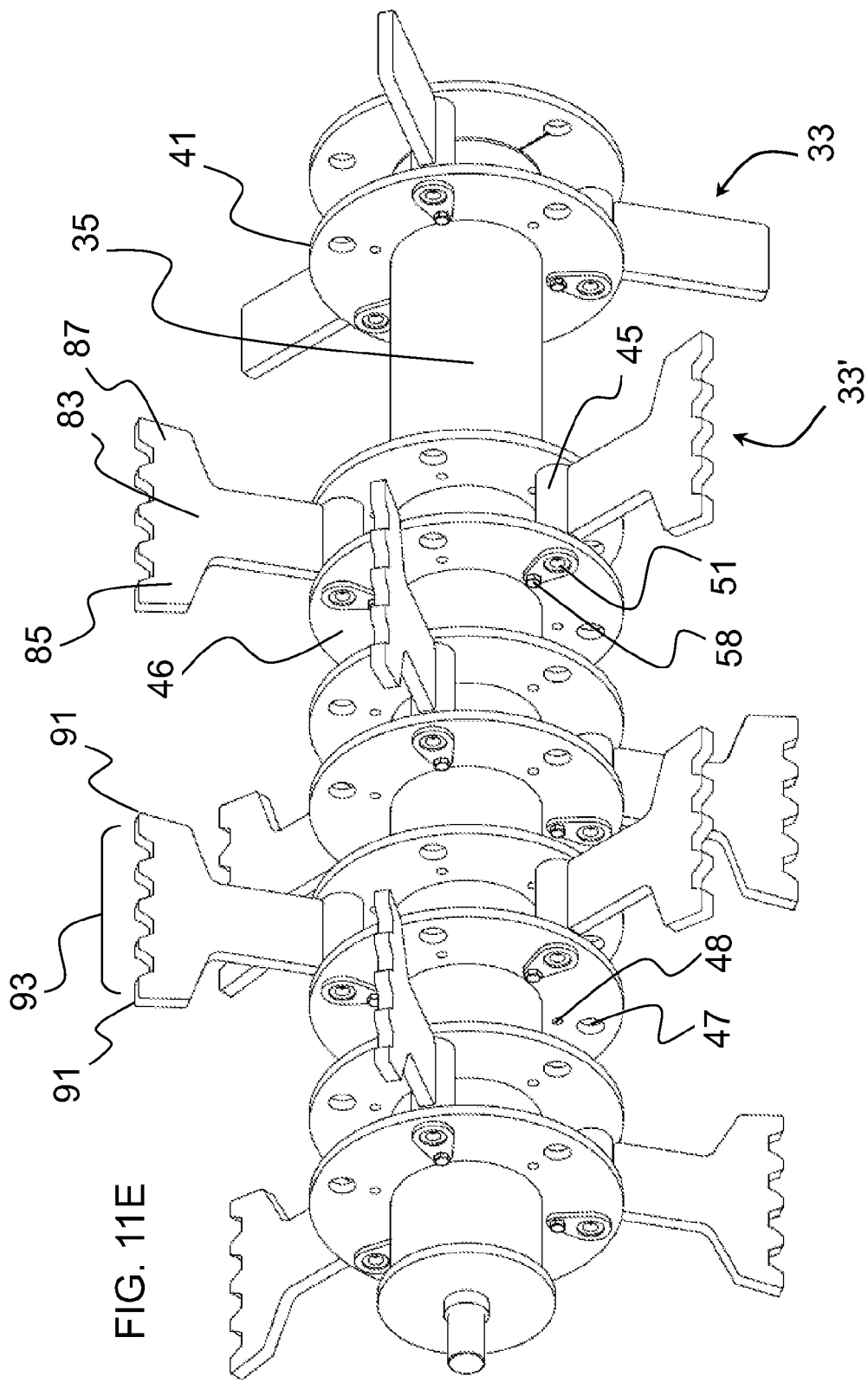

A front elevation view of the paddle 33' and end view of the crenellated edge 93 is shown in FIGS. 11C-D. Another important aspect of this embodiment is the location of the center of gravity G being closer to the free end of the paddle 33' than in the previous embodiment. This creates a greater mass towards the free end, and with the drum rotation and angular acceleration of the paddles 33' remaining essentially the same, a greater force is generated on the material influenced by the paddle and in particular the larger fluke portion of the paddle 33'. Either embodiment of the paddles 33 and 33' may be used exclusively along the core drum 35 or alternatively, as shown in FIG. 11E, the paddles 33 and 33' may be mixed and matched on a set of connecting rings 41 or a set of the fluke shaped paddles 33' may be used on one or more set of connecting rings 41 with the paddles 33 along the core drum 35 to provide for adequate dispersal of material of various consistencies. Similar to paddle 33 the removal and replacement of the fluke shaped paddles 33' requires no welding or cutting of the ring or paddle assembly and a paddle 33 may be easily removed and replaced with a fluke shaped paddle 33' to improve material dispersal.

The invention has been described in detail with particular reference to certain preferred embodiments thereof, but it will be understood that variations and modifications can be effected within the spirit and scope of the invention.

We claim:

1. A containment vehicle with a material expeller for spreading bulk material from the containment vehicle, the containment vehicle comprising:

at least one rotatable shaft revolvable about a first axis;
a first set of paddles in a substantially vertically planar position extending from the rotatable shaft, each paddle having a first end and a second end, wherein the paddle extends along its length from the first end of the paddle to a second end of the paddle;
wherein each of the paddles in the first set of paddles pivots at the first end of the paddle about a second axis parallel with and radially spaced from the first axis of the rotatable shaft,
and wherein each of the paddles in the first set of paddles swings freely relative to the second axis,
and wherein the axis about which the rotatable shaft is revolvable is substantially vertically aligned relative to the containment vehicle,
and wherein the containment vehicle is provided with an active floor adapted to support bulk material on a substantially planar moving top surface of the active floor, the active floor in the form of a conveyor belt for moving the bulk material on the moving top surface of the active floor and the top surface of the active floor in a first direction towards the at least one rotatable shaft,
and wherein the first set of paddles is arranged in vertical alignment above a plane containing the top surface of the active floor and a second set of paddles is arranged in vertical alignment below the plane containing the top surface of the active floor, such that the bulk material will fall into the second set of paddles as the active floor is moved in the first direction, and
wherein at least one of the paddles has a center of gravity closer to the second end of the at least one paddle than the first end of the at least one paddle.

2. The containment vehicle as set forth in claim 1 wherein at least a third set of paddles is arranged in vertical alignment above the plane defined by the top surface of the active floor.

3. The containment vehicle as set forth in claim 2 wherein a first axial spacing is provided between the first set of paddles and the second set of paddles and a second axial spacing smaller than the first axial spacing is provided between the first set of paddles and the third set of paddles above the plane defined by the top surface of the active floor, wherein the first spacing positions the first set of paddles above the plane defined by the top surface of the active floor and the second set of paddles below the plane defined by the top surface of the active floor.

4. The containment vehicle as set forth in claim 3 wherein the second axes about which the first set of paddles rotate are arranged radially offset about the first axis relative to the second axes about which the second set of paddles rotate.

5. The containment vehicle as set forth in claim 1 wherein each of the paddles pivotably affixed to the rotatable shaft has a freedom of movement of greater than 180 degrees about the second axis.

6. The containment vehicle as set forth in claim 1 wherein the first set of paddles pivotally affixed to the rotatable shaft comprises a free end having an increased surface area relative to the remainder of the paddle.

7. The containment vehicle as set forth in claim 3 wherein the first spacing permits a larger quantity of bulk material to pass through the first spacing to be spread by the second set of paddles.

8. The containment vehicle as set forth in claim 3 wherein the first spacing permits objects in the bulk material to pass in between the first set of paddles and the second set of paddles.

9. The containment vehicle as set forth in claim 3 wherein the first spacing provides clearance between an end of the active floor and the first set of paddles and the second set of paddles.

10. The containment vehicle as set forth in claim 1 wherein substantially all of the bulk material in the material expeller is supported above the active floor.

11. The containment vehicle as set forth in claim 1 wherein the at least one of the paddles has a larger surface area proximate the second end than the surface area proximate the first end.

12. The containment vehicle as set forth in claim 11 wherein the second end having the larger surface area defines the center of gravity of the at least one of the paddles being closer to the second end of the paddle than the first end connected of the paddle to the rotatable shaft.

13. A containment vehicle with a material expeller for spreading bulk material from the containment vehicle, the containment vehicle comprising:

a moving floor in the containment vehicle which supports the bulk material on a substantially planar moving top surface of the moving floor and an opening in the containment vehicle through which the bulk material is ejected from the vehicle, the moving top surface of the moving floor moving the bulk material in a first direction towards and out the opening;

at least one rotatable shaft positioned adjacent the opening and revolvable about a first axis aligned substantially vertically with respect to a ground surface supporting the vehicle to facilitate ejection of the bulk material;

a first set of separate paddles in a substantially vertical planar position extending from the rotatable shaft, each paddle having a first end and a second end, wherein the paddle extends along its length from the first end of the paddle to a second end of the paddle; and wherein each of the paddles in the first set of paddles independently pivots about a second axis at the first end of the paddle and radially spaced from a surface of the rotatable shaft;

and each of the paddles in the first set of paddles swings freely relative to the second axis, and the first set of paddles is arranged above a plane containing the top surface of the moving floor and a second set of paddles is arranged below the plane containing the top surface of the moving floor, such that the bulk material will fall into the second set of paddles as the moving floor is moved in the first direction and wherein at least one of the paddles has a center of gravity closer to the second end of the at least one paddle than the first end of the at least one paddle.

14. The containment vehicle as set forth in claim 13 wherein sets of paddles are axially spaced apart along the surface of the rotatable shaft substantially from below the floor to a top of the opening in the containment vehicle.

15. The containment vehicle as set forth in claim 13 further comprising a removable pin defining the second axis about which each of the paddles in the first set of paddles pivots relative to the rotatable shaft.

16. The containment vehicle as set forth in claim 13 wherein the at least one of the paddles has a larger surface area proximate the second end than the surface area proximate the first end.

17. The containment vehicle as set forth in claim 16 wherein the second end having the larger surface area defines the center of gravity of the at least one of the paddles being closer to the second end of the paddle than the first end connected of the paddle to the rotatable shaft.

18. The containment vehicle as set forth in claim 13 wherein each of the paddles in the first set of paddles pivotably affixed to the rotatable shaft has a freedom of movement of between at about 90 and 270 degrees about the second axis.

19. A method of expelling bulk material from a containment vehicle comprising the steps of:

defining an opening in the containment vehicle through which the bulk material is ejected from the vehicle;

positioning at least one rotatable shaft adjacent the opening and revolvable about a first axis aligned substantially vertically with respect to a ground surface supporting the vehicle to facilitate ejection of the bulk material;

connecting a first set of separate paddles to the at least one rotatable shaft, each paddle having a first end and a second end, wherein the paddle extends along its length from the first end of the paddle to a second end of the paddle;

pivoting each of the paddles in the first set of separate paddles about a second axis at a first end of each paddle, the second axis radially spaced from a surface of the rotatable shaft; and providing the containment vehicle with a moving floor supporting bulk material on a substantially planar moving top surface of the moving floor and moving the bulk material on the moving top surface of the moving floor in a first direction towards the opening in the containment vehicle on top of the moving floor, wherein the first set of separate paddles is arranged above a plane containing the top surface of the moving floor and a second set of separate paddles is arranged below the plane containing the top surface of the moving floor, such that the bulk material will fall into the second set of paddles as the moving floor is moved in the first direction, and wherein at least one of the paddles has a center of gravity closer to the second end of the at least one paddle than the first end of the at least one paddle.

20. The method of expelling bulk material from a containment vehicle as set forth in claim 19 further comprising the step of directing the bulk material towards the opening in the containment vehicle by a conveyor.

21. The method of expelling bulk material from a containment vehicle as set forth in claim 19 further comprising the step of axially spacing the paddles along the surface of the rotatable shaft substantially from a point below the floor to a top of the opening in the containment vehicle.

22. The containment vehicle as set forth in claim 13 wherein the moving floor is a conveyor belt.

23. The containment vehicle as set forth in claim 13 wherein at least a third set of paddles is arranged in vertical alignment above the plane defined by the top surface of the moving floor, and wherein a first axial spacing is provided between the first set of paddles and the second set of paddles and a second axial spacing smaller than the first axial spacing is provided between the first set of paddles and the third set of paddles above the plane defined by the top surface of the moving floor, wherein the first spacing positions the first set of paddles above the plane defined by the top surface of the moving floor and the second set of paddles below the plane defined by the top surface of the moving floor.

24. The containment vehicle as set forth in claim 23 wherein the first spacing permits a larger quantity of bulk material to pass through the first spacing to be spread by the second set of paddles.

25. The containment vehicle as set forth in claim 23 wherein the first spacing permits objects in the bulk material to pass in between the first set of paddles and the second set of paddles.

26. The containment vehicle as set forth in claim 23 wherein the first spacing provides clearance between an end of the moving floor and the first set of paddles and the second set of paddles.

27. The method of expelling bulk material from a containment vehicle as set forth in claim 19 further comprising the steps of providing at least a third set of paddles arranged in vertical alignment above the plane defined by the top surface of the moving floor, wherein a first axial spacing is provided between the first set of paddles and the second set of paddles and a second axial spacing smaller than the first axial spacing is provided between the first set of paddles and the third set of paddles above the plane defined by the top surface of the moving floor, wherein the first spacing positions the first set of paddles above the plane defined by the top surface of the moving floor and the second set of paddles below the plane defined by the top surface of the moving floor.

28. The method of expelling bulk material from a containment vehicle as set forth in claim 27 wherein the first spacing permits a larger quantity of bulk material to pass through the first spacing to be spread by the second set of paddles.

29. The method of expelling bulk material from a containment vehicle as set forth in claim 27 wherein the first spacing permits objects in the bulk material to pass in between the first set of paddles and the second set of paddles.

30. The method of expelling bulk material from a containment vehicle as set forth in claim 27 wherein the first spacing provides clearance between an end of the moving floor and the first set of paddles and the second set of paddles.

31. The method of expelling bulk material from a containment vehicle as set forth in claim 27 wherein substantially all of the bulk material in the material expeller is supported above the moving floor.

32. The method as set forth in claim 19 wherein the at least one of the paddles has a larger surface area proximate the second end than the surface area proximate the first end.

33. The method as set forth in claim 32 wherein the second end having the larger surface area defines the center of gravity of the at least one of the paddles being closer to the second end of the paddle than the first end connected of the paddle to the rotatable shaft.

\* \* \* \* \*